United States Patent [19]
Jou

[11] Patent Number: 5,855,222
[45] Date of Patent: Jan. 5, 1999

[54] MULTI-PURPOSE PNEUMATIC TOOL

[76] Inventor: Wuu-Cheau Jou, No. 95, Cheng-Kung 2nd Rd., Ta-Li City, Taichung County, Taiwan

[21] Appl. No.: 721,027

[22] Filed: Sep. 26, 1996

[51] Int. Cl.$^6$ .................................................. F16K 15/20
[52] U.S. Cl. ............................................ 137/223; 137/580
[58] Field of Search ............................... 137/580, 223, 137/884

[56] References Cited

U.S. PATENT DOCUMENTS

| | | | |
|---|---|---|---|
| 2,344,492 | 5/1944 | Brubaker | 137/223 |
| 2,482,922 | 9/1949 | Marcum | 137/223 |
| 2,716,998 | 9/1955 | Knasko | 137/231 |
| 2,869,573 | 1/1959 | Stafford | 137/223 |
| 3,827,635 | 8/1974 | Krakowski et al. | 137/223 |

*Primary Examiner*—John Rivell
*Assistant Examiner*—Meredith Schoenfeld
*Attorney, Agent, or Firm*—Rosenberg, Klein & Bilker

[57] ABSTRACT

A multi-purpose pneumatic tool combining the functions of an air blow gun, an air regulator, a tire chuck and a swivel connector includes a casing, a control body and a bolt assembly. The control body is provided with respective holes and connectors for screwably locking an air blow gun, a control body, a tire chuck and a control button. A bolt assembly couples the casing to the control body such that the control body and the casing may rotate freely with the bolt assembly as a pivotal center. The air blow gun may also perform free rotation along another axis. The multi-purpose pneumatic tool may also assembly to other tool to widen its applications.

1 Claim, 7 Drawing Sheets

MULTI-PURPOSE PNEUMATIC TOOL

BACKGROUND OF THE INVENTION (a) Field of the Invention:

The present invention relates generally to a pneumatic tool, and more particularly to a multi-purpose pneumatic tool.

(b) Description of the Prior Art:

There are numerous kinds of pneumatic tools using compressed air as power, such as air blow guns, tire chucks, stapling guns, etc. But, as is well known, these pneumatic tools generally have only a single function. One such pneumatic tool is shown in FIG. 1. A pneumatic stapling gun 99 is connected to an air hose 90 by means of a connector 91, and compressed air is conducted into the interior of the stapling gun 99 for use. However, there have been known at least the following drawbacks with such prior art:

1. As use of the connector 91 to associate the stapling gun 99 with the air hose 90 is to fixedly secure them both. Therefore, in use, the air hose 90 cannot revolve to match the jobs, and the connector 91 is also immovable. As a result, the air hose 90 may easily get entangled, causing inconvenience to the operator.

2. The connector 91 itself does not have other functions than as a means of connection. It often has to be replaced when serving for other purposes. Even in the case of air blow guns, it has to be mounted anew, which is very inconvenient indeed.

3. As the connector 91 has to be removed from or coupled to pneumatic tools in different jobs, the connector 91 will wear fast, which may result in air leakage and reduce the life of the connector 91.

4. Different pneumatic tools require different amount of air flow. As the air flow from the air hose 90 cannot be controlled, the components of the pneumatic tools may be easily damaged, affecting the life thereof.

SUMMARY OF THE INVENTION

Accordingly, a primary object of the present invention is to provide a multi-purpose pneumatic tool which has the advantages of extensive applications, convenience and good effects, thus eliminating the drawbacks with the prior art.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
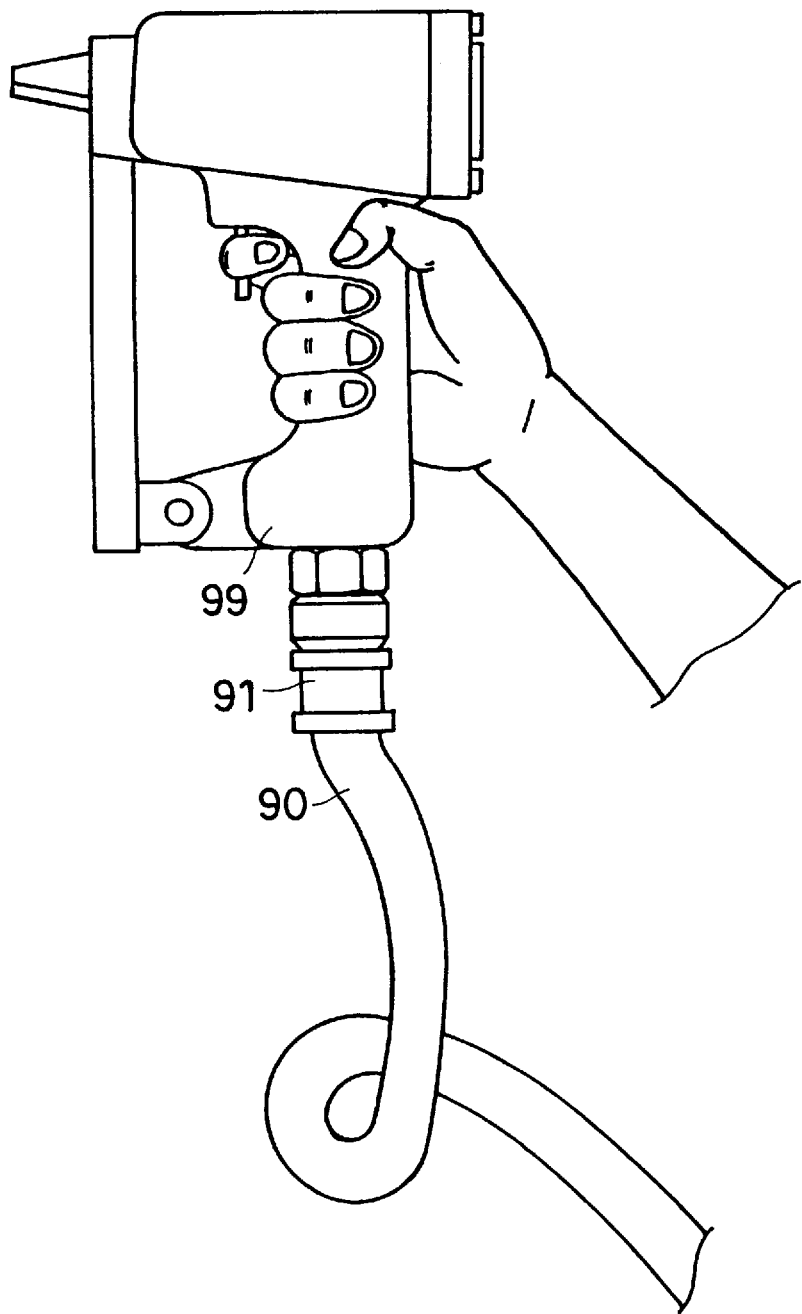
FIG. 1 is a schematic view of a prior pneumatic tool.
Figure 2:
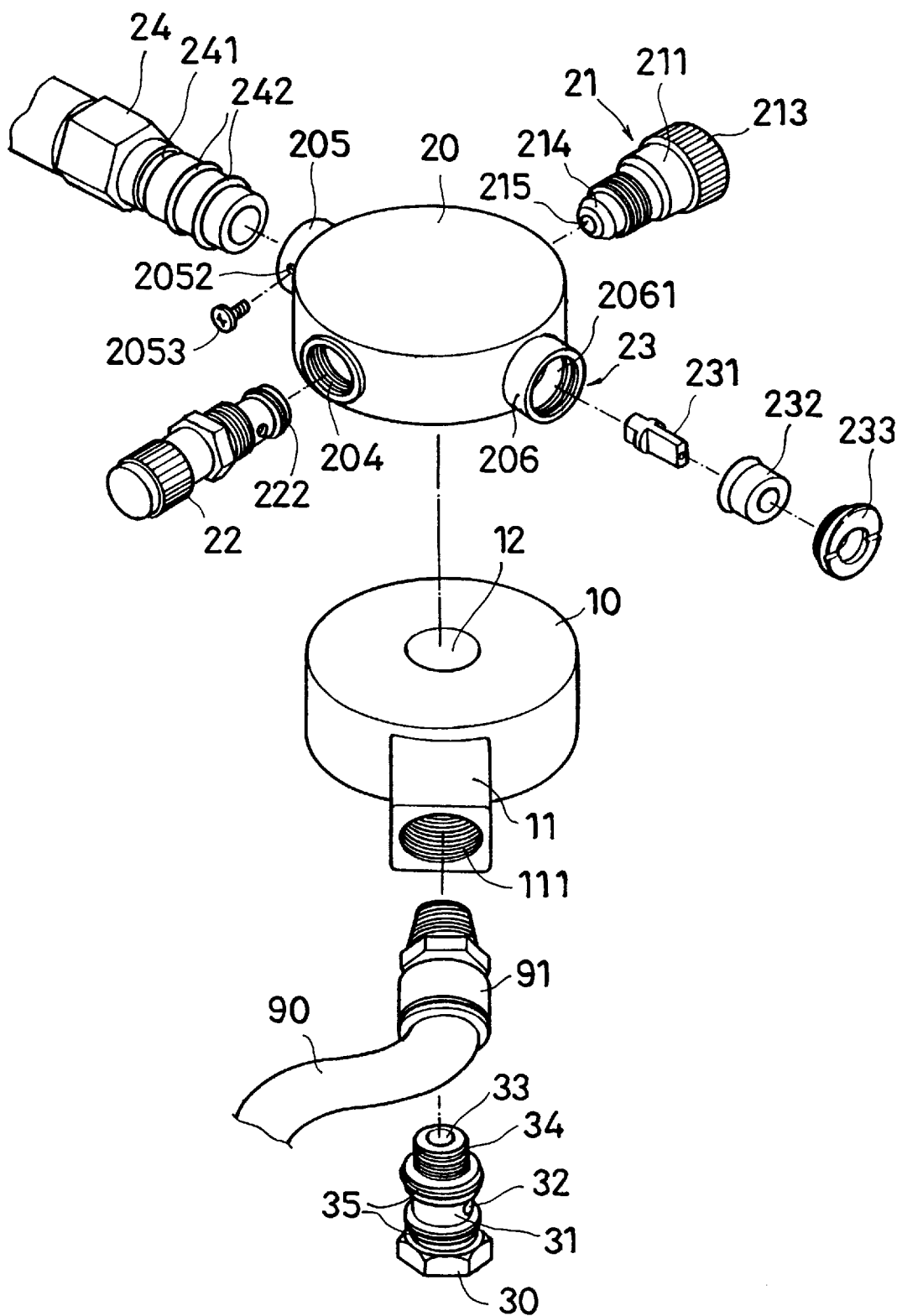
FIG. 2 is an elevational, exploded view of the present invention.
Figure 3:
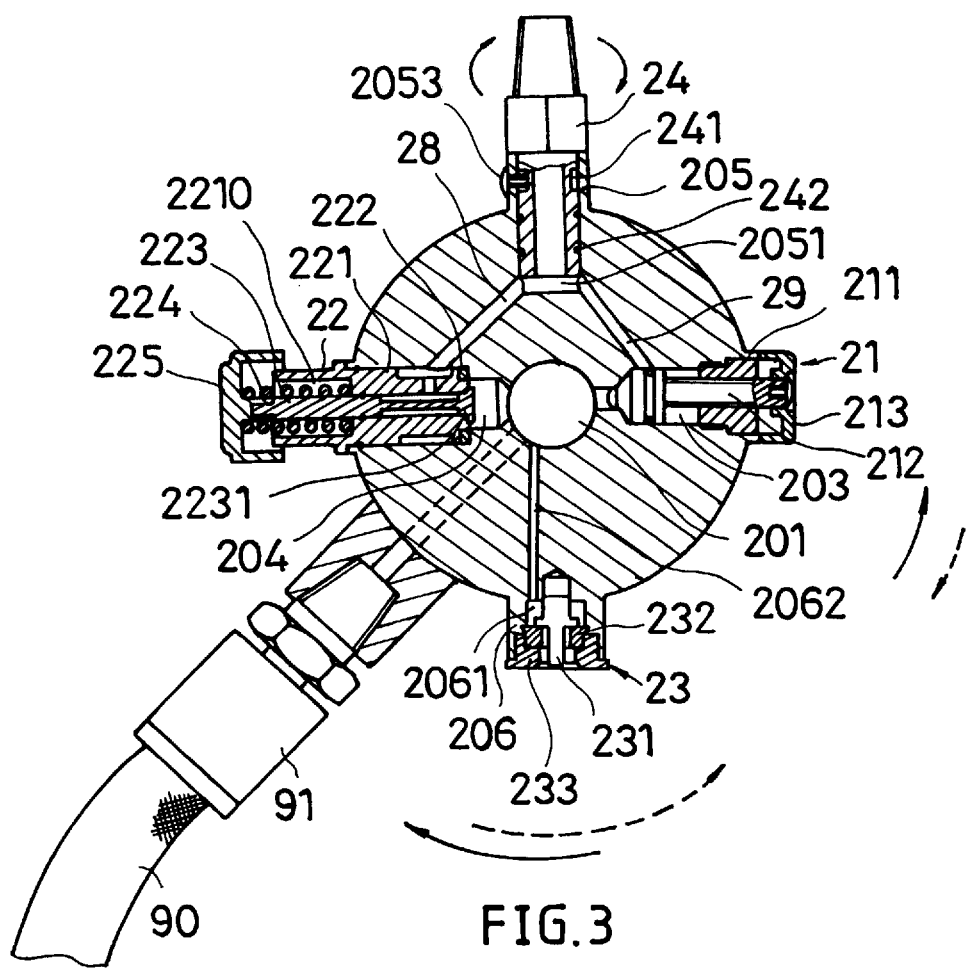
FIG. 3 is a top plan view of the present invention in section.
Figure 4:
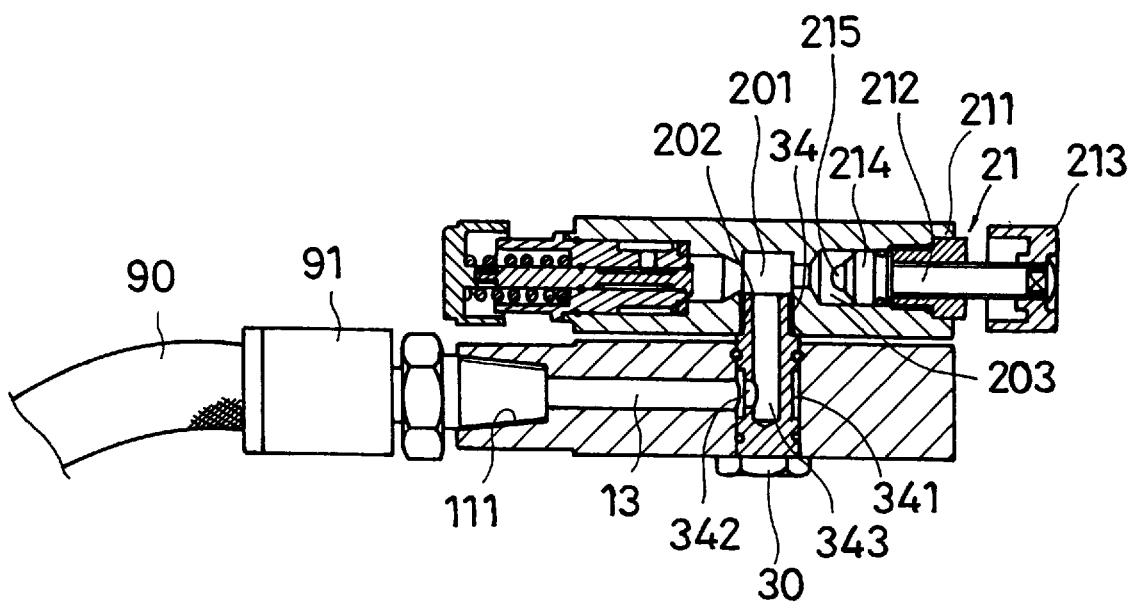
FIG. 4 is a side plan view of the present invention in section.

With reference to FIGS. 2, 3 and 4, the present invention essentially comprises a casing tool body 10, a control body 20, and a bolt assembly.

The casing 10 is substantially a circular structure having an air intake connector 11 disposed at its periphery. The air intake connector 11 is provided with a tapered screw hole 111 at its end and may be screwably locked with a connector 91 of an air hose 90. An axial through coupling hole 12 is formed at the center of the casing 10, and an air path 13 is formed connecting the screw hole 111 to the coupling hole 12.

The control body 20 is provided with a blind hole 201 of a suitable depth at the center of its bottom side. The end of the blind hole 201 is configured to have a screw hole 202 for screwably locked with the bolt assembly 30. An air regulator hole 203 and a control button hole 204 are respectively provided at opposite peripheral ends of the control body 20 for receiving an air regulator 21 and an air flow control button 22 respectively, the air regulator hole 203 and the control button hole 204 both pass through the blind hole 201. A first connector 205 and a second connector 206 are protrudently provided at opposite peripheral ends of the control body 20, respectively having a receiving hole 2051, 2061 of a suitable depth for receiving an air blow gun 24 and a tire chuck 23 respectively. The outer side of the first connector 205 is provided with a screw hole 2052 for receiving a screw 2053. The receiving hole 2051 of the connector 25 is connected to both the air regulator 203 and the control button hole 204 by respective ducts 28, 29. The receiving hole 2061 is connected to the coupling hole 12 by means of an air path 2062.

The above-mentioned air regulator 21 includes a locking sleeve 211 screwably clocked into the air regulator hole 203. The locking sleeve 211 in turn has a bolt 212 locked therein. The bolt 212 has one end projecting from the locking sleeve 211 with its extreme end screwably linked-up with a button 213 and the other end provided with a valve cock 214. A rear end of the valve cock 214 is provided with a ball cock 215, which will be caused by the button 213 to control the opening or closing between the air regulator hole 203 and the blind hole 201.

The air flow control button 22 includes a button body 221 having one end provided with a packing pad 222 and the other end provided with a receiving hole 2210, and has a push-button 225 linked to a valve rod 223 fitted with a spring 224. The valve rod 223 has a rear end provided with a valve cock 2231 which may close the button body 221. The control button 22 is screwably locked onto the control body 20.

The air blow gun 24 comprises a tubular body provided with an annular groove 241. A rear section of the tubular body is provided with a plurality of O-rings 242 and is screwably locked into the screw hole 2052 of the first connector 205 by means of a screw 2053, engaging the annular groove 241, thereby the air blow gun 24 is retained and prevented from slipping out of the first connector 205. The air blow gun 24 is coupled to the first connector 205 such that a suitable space is left between the first connector 205 and the rear section.

The tire chuck 23 includes a screw cap 233 and a valve rod 231. The valve rod 231 is disposed inside the receiving hole 2061 of the second connector 206. The valve rod 231 is fitted with a packing ring 232 and secured by the screw cap 233 locked into the receiving hole 2061. By means of the air inside the air path 2062, the valve rod 231 may urge against the packing ring 232 to achieve prevention of possible air leakage.

The bolt assembly 30 is provided with an air path 33 of a suitable depth at a rear section thereof. The rear section is provided with a plurality of external threads on its outer peripheral surface for engaging the screw hole 202 of the control body 20. The bolt assembly 30 further has an annular groove 31 disposed at a suitable position at a middle section thereof. A U-shaped ring 35 is disposed both above and below the annular groove 31. The annular groove 31 is provided with an air hole 32 passing axially through the air path 33. The bolt assembly 30 is assembled to the casing 10, which is in turn coupled to the control body 20. Both the casing 10 and the control body 20 may freely turn to match the free rotation of the air blow gun 24 so that they form a swivel connector capable of three-dimensional free rotation like a universal connector.

The operation and effects of the present invention will be described below with reference to the accompanying drawings.

OPERATION OF THE AIR BLOW GUN

Figure 5A:
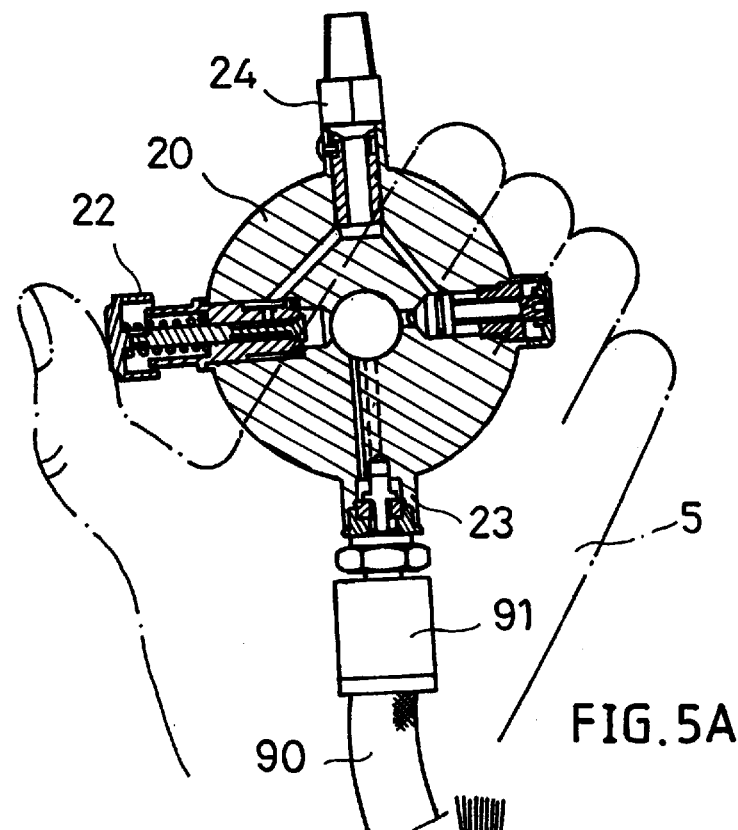
FIG. 5(A) is a schematic view illustrating the present invention held by the palm of the operator.
Figure 5B:
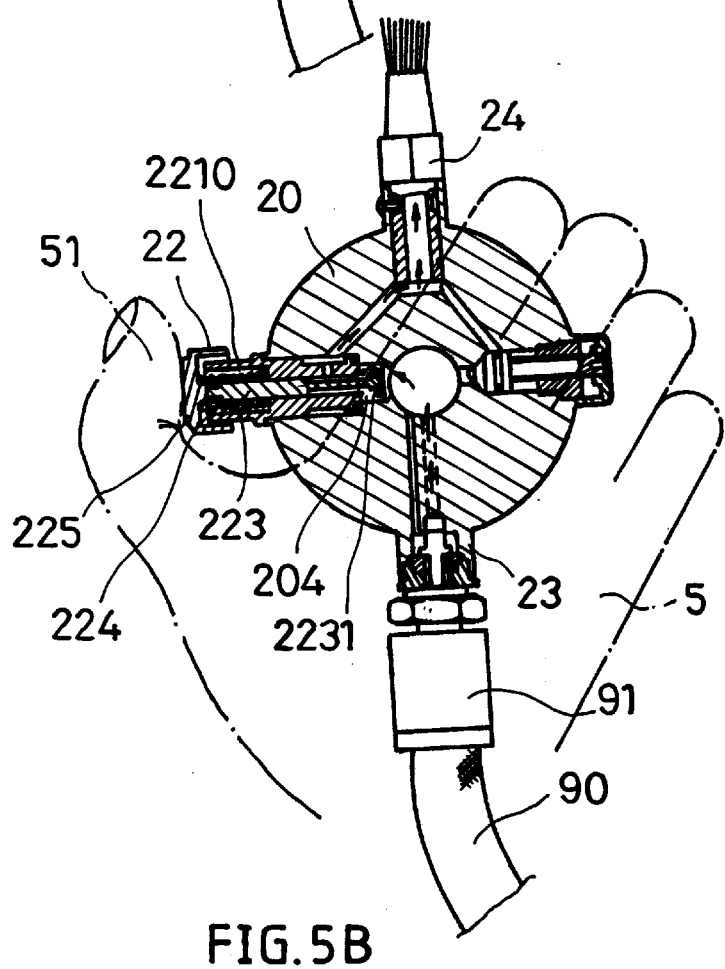
FIG. 5(B) illustrates operation of the air blow gun according to the present invention.

With reference to FIGS. 5(A) and 5(B), the operator may use his/her palm 5 to directly hold the palm-sized control body 20 with his/her thumb 51 on the push-button 225 to control release of air. The other four fingers, on the other hand, grip the control body 20 to stabilize it and to prevent it from dropping during operation. To operate the air blow gun 24, it is only necessary to push the push-button 225 so that the valve cock 2231 of the valve rod 223 linked-up with the push-button 225 pushes into the control button hole 204 and compresses the spring 224 inside the receiving hole 2210, thereby compressed air is released and passes from the air hose 90 into the air path 13 of the casing 10 and, via the air hole 32 and air path 33 of the bolt assembly 30, into the blind hole 201 of the control body 20, where it continue to pass through the control button hole 204 via the air hole 2210 into the air path 28 to the air blow gun 24 for blowing purposes. At this point, both the air regulator 21 and the tire chuck 207 are closed, so that air can only flow out from the control button 22. As the control button 22 is an independent element, if it is damaged, it can be repaired or replaced conveniently.

OPERATION OF THE TIRE CHUCK

Figure 6:
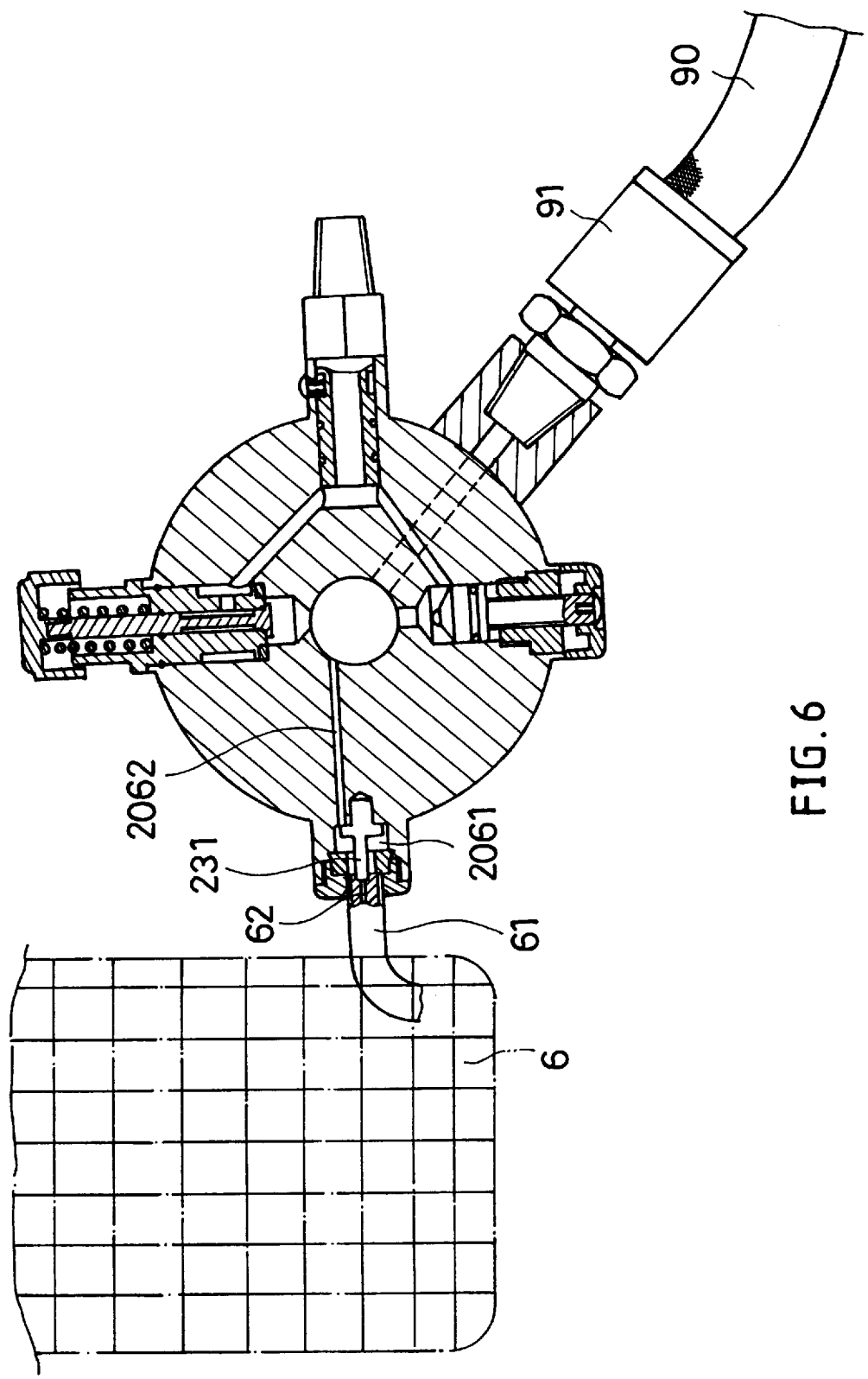
FIG. 6 is a schematic view illustrating use of the tire chuck according to the present invention in inflation.

With reference to FIG. 6, to pump air into a tire 6, it is only necessary to align the tire chuck 23 provided on the control body 20 with an inflation valve 61 of the tire 6 so that a valve rod 62 of the tire 6 and the valve rod 231 of the tire chuck 23 presses against each other. The valve rod 231 will then retreat into the receiving hole 2061 and the valve rod 62 will also retreat into the inflation valve 61, so that there is a clearance between them, allowing air from the air path 2061 into the tire 6 to inflate the latter.

OPERATION OF THE SWIVEL CONNECTOR

Figure 7A:
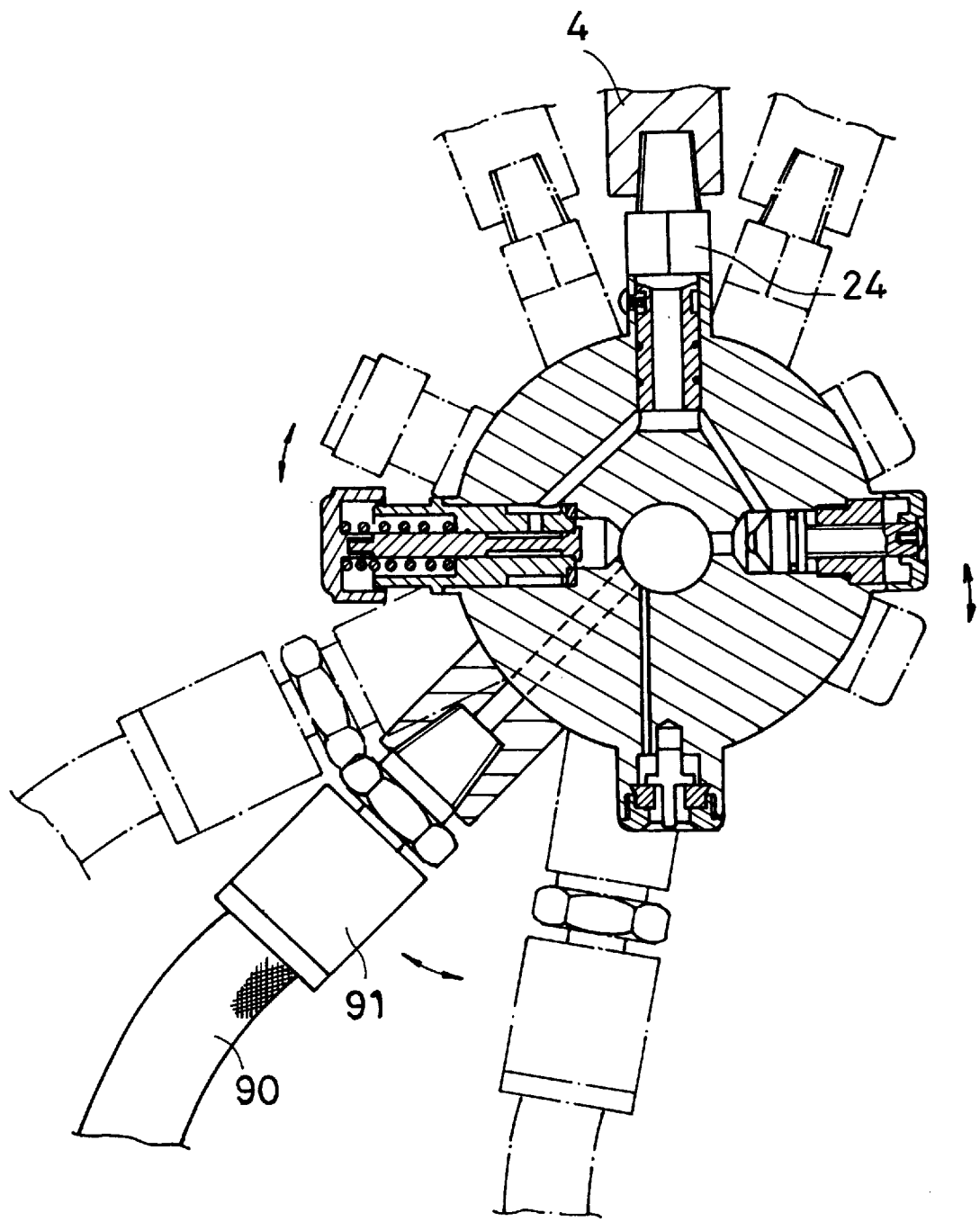
FIG. 7(A) is a schematic view illustrating rotation of the controlled mechanism according to the present invention.
Figure 7B:
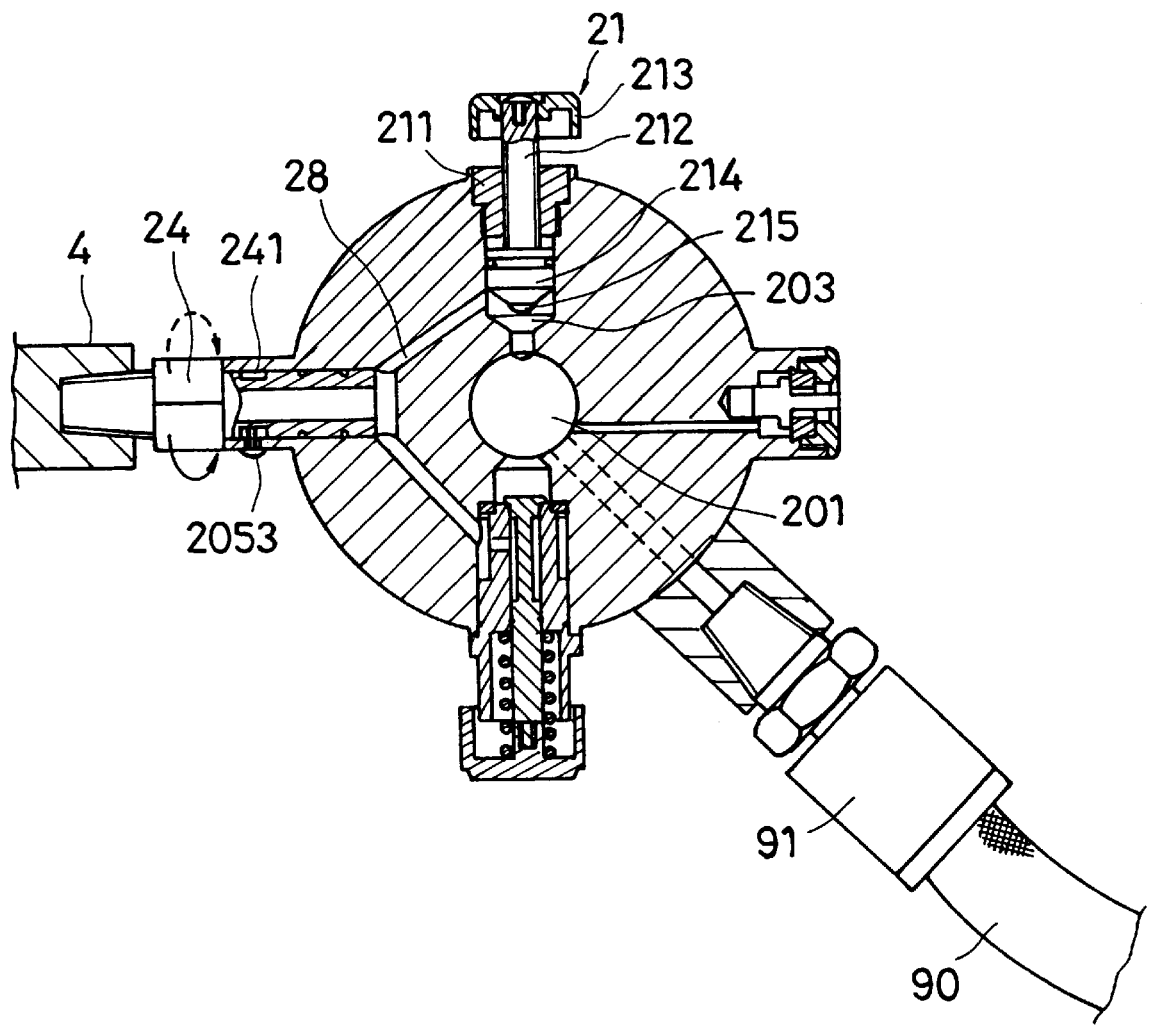
FIG. 7(B) is a schematic view illustrating rotation of the air blow gun according to the present invention.

For conventional pneumatic tools 4, it has been known that it is necessary to move or turn the tool to prevent the air hose 90 from getting entangled and that the operator has to bend his arm this way or that to operate the tool. Referring to FIGS. 7(A) and 7(B), the control body 20 is disposed on the casing 10 by means of the bolt assembly 30 so that the control body 20 may longitudinally rotate about 360° on the casing 10 with the bolt assembly 30 as center. Referring to FIG. 7(B), the air blow gun 24 is screwably locked into the first connector 205 using the screw 2053 and is retained by the annular groove 241 so that the air blow gun 24 may horizontally rotate about 360°. In addition, the invention may also allow the operator to achieve free rotation of a third dimension using the palm, i.e., using the elbow as the center of rotation. In this way, it is only necessary to rotate the control body 20 and the air blow gun 24 when operating the air blow gun 24. It is not necessary to bend or turn the arm and the air hose 90 through large angles during operation.

OPERATION OF THE AIR REGULATOR

Reference is made to FIG. 7(B). The air blow gun 24 is used in conjunction with the other pneumatic tools 4. But different pneumatic tools require different amount of air flow. The flow of compressed air must therefore be controlled. By means of adjusting the air regulator 21 to alter the clearance between the ball cock 215 and the air regulator hole 203 so as to control the air flow from the blind hole 201 to the air path 28, the amount of compressed air into the pneumatic tool 4 may be controlled so that different pneumatic tools 4 may achieve optimum performance and have longer life.

In summary, the present invention has the following advantages:

1. That the control body and the casing are mounted in a concentric manner on the bolt assembly allows free rotation and convenient operation.

2. The circular shape of the control body allows a best design of space to accommodate four most commonly used tools on a single body.

3. The arrangement of the air blow gun and the control button provides air blow effects like ordinary air blow guns.

4. The air regulator controls the amount of compressed air into the air blow gun or other pneumatic tools, preventing possible damage to the tool parts or the workpieces due to excessive compressed air flow.

5. The arrangement of the casing, the control body, and the air blow gun allows free rotation to make operation easy and convenient.

6. The tire chuck provided on the control body may be used for inflation purposes.

7. The present invention has multiple functions, in particular, the air blow gun may be used in conjunction with other pneumatic tools, eliminating the problem of changing connectors in the prior art.

8. The present invention is less costly to manufacture.

Although the present invention has been illustrated and described with reference to the preferred embodiment thereof, it should be understood that it is in no way limited to the details of such embodiment but is capable of numerous modifications within the scope of the appended claims.

What is claimed is:

1. A multi-purpose pneumatic tool, comprising:
  a casing of substantially a circular shape, said casing having an air intake connector at a peripheral rim thereof, said air intake connector being provided with a tapered screw hole at an end section thereof for screwably engaging a a connector of an air hose, said casing having a coupling hole extending axially through a center thereof, an air path being provided to extend radially from said tapered screw hole through said coupling hole;
  a control body, said control body having a blind hole of a suitable depth disposed at a central position of a bottom side thereof, said blind hole having an end section provided with a screw hole; an air regulator and a control button hole both of which pass through said blind hole and are disposed respectively at opposite ends of an outer peripheral rim of said control body;

two projecting connectors respectively disposed at a front end and a rear end of said control body, said connectors each having a receiving hole and a screw hole at an outer periphery thereof for receiving a screw; said air regulator hole and said control button hole being connected to said receiving hole of a first of said connectors by air paths, and said receiving hole of a second of said connectors communicating with said coupling hole via an air path;

an air regulator, said air regulator comprising a locking sleeve screwably locked to said air regulator hole for receiving a bolt, one end of said bolt projecting from said locking sleeve with an extreme end thereof screwably locked and linked-up with a button element, the other end of said bolt being provided with a valve cock, said valve cock having a ball cock at an extreme end thereof, said ball cock being linked-up with said button element to open or close between said air regulator hole and said blind hole to achieve control of air flow;

an air flow control button screwably locked onto said control body, said control button having a button body provided with a packing pad at one end thereof and a receiving hole at the other end thereof, said control button further having a push-button linked to a valve rod fitted with a spring, said valve rod being provided with a valve cock at one end thereof for closing said button body;

an air blow gun having a substantially tubular body provided with an annular groove and a plurality of O-rings at rear end section thereof, said tubular body being locked into said receiving hole of said first of said connectors by means of a screw until being retained at said annular groove to prevent said air blow gun from slipping out of said connector, said air blow gun being assembled to said first connector with a suitable space left at the rear end section;

a tire chuck, said tire chuck comprising a screw cap screwably locked onto said second of said connectors, a valve rod disposed in said receiving hole of said second connector, said valve rod being fitted with a packing ring before secured in place by said screw cap, said valve rod urging against said packing ring by means of air in the air path to achieve prevention of air leakage;

a bolt assembly, said bolt assembly having an air path of a suitable depth at a rear end section thereof, said rear end section having external threads on its outer peripheral surface for engaging said screw hold of said control body; an annular groove disposed at a suitable position; and two U-shaped rings respectively disposed above and below said annular groove, said annular groove having an air hole extending radially through said air path, said bolt assembly being provided to assemble said casing to said control body such that said bolt assembly may move freely inside said casing and said casing and said control body may freely rotate to match the free rotation of said air blow gun to form a swivel connector capable of three-dimensional free rotation like a universal connector.

\* \* \* \* \*